(12) United States Patent
Tang et al.

(10) Patent No.: US 8,935,565 B2
(45) Date of Patent: Jan. 13, 2015

(54) DUAL-CHANNEL HOT STANDBY SYSTEM AND METHOD FOR CARRYING OUT DUAL-CHANNEL HOT STANDBY

(75) Inventors: Tao Tang, Beijing (CN); Lianchuan Ma, Beijing (CN); Xi Wang, Beijing (CN); Binbin Yuan, Beijing (CN)

(73) Assignee: Beijing Jiaotong University, Beijing (CN)

(*) Notice: Subject to any disclaimer, the term of this patent is extended or adjusted under 35 U.S.C. 154(b) by 171 days.

(21) Appl. No.: 13/811,025

(22) PCT Filed: Jul. 20, 2011

(86) PCT No.: PCT/CN2011/001187
§ 371 (c)(1),
(2), (4) Date: Mar. 29, 2013

(87) PCT Pub. No.: WO2012/009960
PCT Pub. Date: Jan. 26, 2012

(65) Prior Publication Data
US 2013/0179723 A1 Jul. 11, 2013

(30) Foreign Application Priority Data
Jul. 22, 2010 (CN) .......................... 2010 1 0235370

(51) Int. Cl.
G06F 11/00 (2006.01)
G06F 11/20 (2006.01)
(Continued)

(52) U.S. Cl.
CPC .............. *G06F 11/2023* (2013.01); *H04L 1/22* (2013.01); *H04L 2001/0094* (2013.01)
USPC ......................................... 714/4.12; 714/15

(58) Field of Classification Search
USPC ........................................................ 714/4.12
See application file for complete search history.

(56) References Cited

U.S. PATENT DOCUMENTS 6,629,263 B1* 9/2003 Sassi ................................ 714/15
6,865,591 B1* 3/2005 Garg et al. .................... 709/201
(Continued)

FOREIGN PATENT DOCUMENTS

CN 1437326 A 8/2003
CN 101090308 A 12/2007
(Continued)

*Primary Examiner* — Kamini Patel
(74) *Attorney, Agent, or Firm* — Knobbe Martens Olson & Bear LLP

(57) ABSTRACT

A dual-channel hot standby system and a method for carrying out dual-channel hot standby, the system comprises a hot standby status management layer including two hot standby management units, an application processing layer including two application processors, and a data communication layer including two communicators; the hot standby status management layer is used for controlling the setting and switching between a active status and a standby status of the two application processors, monitoring the working status of the data communication layer, and carrying out synchronization of the control cycles for the two channels of the system; wherein one of the hot standby management units controls one of the application processors, and together constitute a channel of the system therewith; the data communication layer is used for receiving data from outside, and forwarding the data to the application processing layer. The present invention avoids the occurrence of "dual-channel-active" or "dual-channel-standby" status; ensures synchronization of the control cycles of two channels; reduces the time of the system for responding to breakdowns; meets the real-time requirements; enhances the reliability and availability of the system; and ensures a seamless switching between active and standby statuses.

5 Claims, 3 Drawing Sheets

(51) Int. Cl.
*H04L 1/22* (2006.01)
*H04L 1/00* (2006.01)

(56) References Cited

U.S. PATENT DOCUMENTS

| | | | |
|---|---|---|---|
| 7,096,248 B2 * | 8/2006 | Masters et al. | 709/201 |
| 7,437,605 B2 * | 10/2008 | Blevins, Sr. | 714/11 |
| 7,502,823 B2 * | 3/2009 | Garg et al. | 709/203 |
| 2005/0028028 A1 * | 2/2005 | Jibbe | 714/6 |
| 2005/0193229 A1 * | 9/2005 | Garg et al. | 714/4 |

FOREIGN PATENT DOCUMENTS

| | | |
|---|---|---|
| CN | 101483540 A | 7/2009 |
| CN | 101917283 A | 12/2010 |

\* cited by examiner

DUAL-CHANNEL HOT STANDBY SYSTEM AND METHOD FOR CARRYING OUT DUAL-CHANNEL HOT STANDBY

CROSS REFERENCE TO RELATED APPLICATION

This application claim the benefit and priority to and is a U.S. National Phase of PCT International Application Number PCT/CN2011/001187, filed on Jul. 20, 2011, designating the United States of America, which claims priority under 35 U.S.C. §119 to Chinese Application Number 201010235370.5 filed on Jul. 22, 2010.

TECHNICAL FIELD

The present invention relates to the technical field of industrial control, in particular to a dual-channel hot standby system and a method for carrying out dual-channel hot standby.

BACKGROUND ART

In fields of industrial control like railway, electric power, iron and steel-producing and petrochemical industry, there are relatively strict requirements for availability and reliability of control systems. The dual-channel hot standby systems are widely used due to the higher availability and reliability, at the same time they have certain capability of fault-tolerance and are convenient for maintenance.

In order to ensure the availability and reliability of a dual-channel hot standby system, several questions that should be taken into consideration in the designing process are status switching, status synchronization and consistency check of "active" and "standby" channels, etc.

In the existing dual-channel hot standby systems, providing with a heartbeat line between two channels is a common technical solution, the presetting and switching between "active" and "standby" statuses are realized by separately determining the status of each other depending on software. This kind of way is short of supervision from a third party, so that when the heartbeat line is out of order, a "standby" channel may mistakenly become an "active" one, which generates a status of dual-channel-active, influences the transmission and control of messages, hence an insecure state may be occurred.

In order to solve the problem of shortage of determination from a third party, some systems are provided with switch units, so that a logic control for switching can be carried out by a simple logic circuit which consists of relays as well as small and medium-sized digital integrated circuits, so as to ensure that only one channel is on "active" status at any moment. However, the function of such switch unit is just limited to the presetting and switching between "active" and "standby" statuses, and it's unable to control the synchronization status between two channels, which results in blind spots for the supervision of dual-channel status. At the same time, the breakdown of a switch unit short of redundancy configuration may cause relatively greater risks to the normal operation of the whole system.

CONTENTS OF THE INVENTION

The technical problem to be solved by the present invention are as follows: first, to avoid the occurrence of a "dual-channel-active" or "dual-channel-standby" status; second, to ensure the synchronization of the control cycles for the two channels; third, to reduce the time for responding to the breakdowns; fourth, to satisfy the real-time requirement of the whole dual-channel hot standby system; fifth, to improve the availability and reliability of the system; finally, to ensure a seamless switching of the "active" and "standby" statuses.

In order to solve the above-mentioned technical problems, the present invention provides a dual-channel hot standby system, which comprises a hot standby status management layer including two hot standby management units, an application processing layer including two application processors and a data communication layer including two communicators; the hot standby status management layer is used for controlling setting and switching of the "active" and "standby" statuses of the two application processors, monitoring the working status of the data communication layer, and carrying out synchronization of the control cycles for the two channels in the system; wherein, one hot standby management unit controls one application processor and constitutes a channel for such system with this processor; the data communication layer is used for receiving data from the outside, and forwarding the data to the application processing layer.

Wherein, the hot standby status management layer, the application processing layer and the data communication layer are all connected to a high-speed communication bus.

Wherein, the two hot standby management units are connected with each other by an interlock/self-lock link bus which functions for carrying out a self-lock/interlock logic, in order to select a channel in normal operation as the one in active status.

Wherein, the two hot standby management units are connected with each other by a synchronization link bus which functions for transmitting synchronous signals from a present active channel to a present standby channel.

Wherein, the design of hot standby status management layer adopts redundant hardware; the two application processors are redundant for each other, so do the two communicators, so as for a shared usage by the two channels; and the high-speed communication bus adopts a redundant structure.

The present invention further provides a method for carrying out the dual-channel hot standby by means of the above-mentioned system, in which the hot standby status management layer controls the setting of active and standby statuses of the two application processors according to the following steps: a hot standby management unit sends working mode codes to a corresponding application processor to inform its working mode, wherein, the working mode codes are representative of working status including active mode and standby mode, or representative of non-working status including power-on mode, breakdown mode, synchronization mode and maintenance mode.

Wherein, the hot standby status management layer controls the switching of active and standby statuses of the two application processors according to the following steps: the two hot standby management units select a channel in normal operation as the one of active status, by means of self-lock/interlock logic between each other; and, at the beginning of each control cycle, the two application processors receive working mode codes from corresponding hot standby management units, and perform workflow for active status or standby status according to the received working mode codes; upon finishing such workflow, the two application processors report their own working statuses to the corresponding hot standby management units, which determine whether such working statuses are normal or not according to the information regarding working statuses; when either of the application processors is found to be abnormal in working, the hot standby management units perform the switching of active and standby statuses by means of the self-lock/interlock logic, and take a redundant strategy for the abnormal application processor to stop it from working.

Wherein, the hot standby status management layer carries out the synchronization of control cycles for the two channels according to the following steps: the hot standby status management layer outputs synchronous signals to the two application processors, which allows the two application processors to work with synchronous control cycles.

Wherein, the synchronization of control cycles for the two channels is carried out by the hot standby status management layer as follows: the hot standby management unit of the present active channel sends synchronous signals through a synchronous link bus connecting the two hot standby management units, from which the hot standby management unit of the present standby channel receives such synchronous signals, in order to ensure that the two hot standby management units are working with synchronous control cycles.

Wherein, the hot standby status management layer monitors the working status of the data communication layer according to the following steps:

during link bus, each communicator sends periodically variable level signals to the hot standby management layer; once this kind of dynamic signals are stopped or anything abnormal is happening thereto, the hot standby management layer determines that the corresponding communicator is abnormal, and sends signals representative of abnormal working status of such communicator to the two application processors of the application processing layer, in order to facilitate them selecting a communicator in normal operation for output.

Wherein, the data communication layer forwards data from outside to the application processing layer upon receiving a data request from the application processing layer, and the data communication layer ensures a synchronization of the data which are sent to the two application processors by identifying the information regarding a serial number of cycle containing in the data request from the application processing layer.

The above-mentioned technical solutions are advantageous in that, it designs a dual-channel hot standby system having hierarchical structure, and controls the presetting and switching of active and standby statuses by means of switch units (that is, the hot standby management units) therein as determination equipments form a third part; Besides, the switch unit uses a design of redundant hardware to select a channel in normal operation as the one in active status by means of the self-lock/interlock logic, so as to avoid the "dual-channel-active" or "dual-channel-standby" status which may be occurred when two channels make determination for each other. At the same time, a switch unit can also output synchronous signals to ensure a synchronization of the control cycles of the two channels, and can monitor the working statuses of the two channels in real-time by workflow control codes, which reduces the time for responding to breakdowns. The data exchange among the three layers in said structure is realized by a high-speed communication bus, which satisfies the real-time requirements of the whole dual-channel hot standby system. The hot standby management unit, the high-speed communication bus and the communicators all adopt redundant structures, which can improve the reliability and availability of the whole system. In addition, in order to ensure a seamless switching of active and standby statuses, three of the following ways are used at the same time: 1) the application processor, before it enters into the standby mode, conducts a synchronization in the synchronous mode according to the data from the application processor which is in the active mode; 2) making the two application processors to be in the working status with synchronous cycles; 3) ensuring a consistency of the input data sent to the two application processors by means of the data communication layer.

SPECIFIC MODES FOR CARRYING OUT THE INVENTION

The following embodiments are described in way of examples for explaining the present invention, but not to limit the scope thereof An embodiment of the present invention provides a dual-channel hot standby system and a method for carrying out dual-channel hot standby by using the same.

Figure 1:
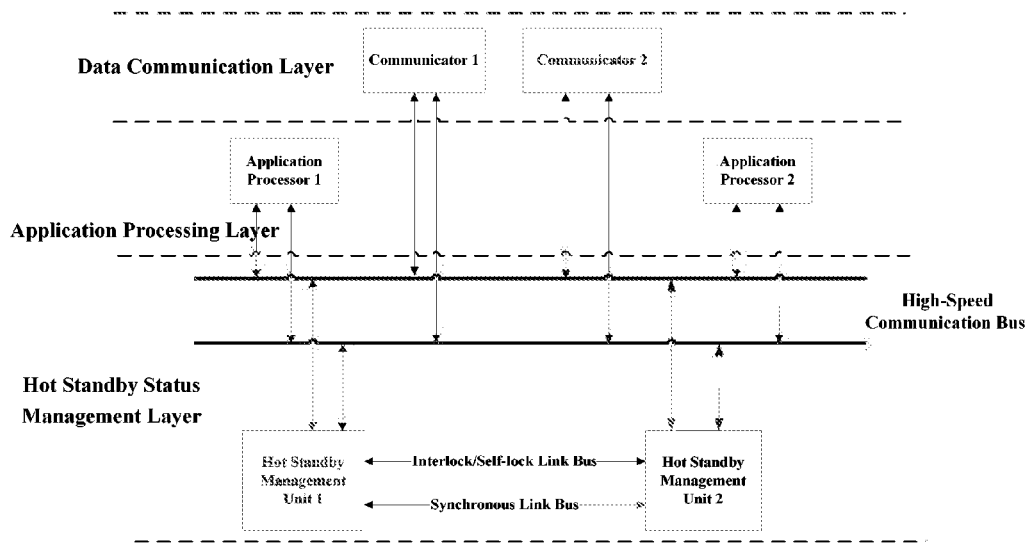
FIG. 1 is a hierarchical structural view of a dual-channel hot standby system according to an embodiment of the present invention.

The dual-channel hot standby system adopts a design of hierarchical structure which can be divided into a hot standby status management layer, an application processing layer and a data communication layer. A hierarchical structural view of the system is shown in FIG. 1.

The hot standby status management layer adopts a design of redundancy hardware, which comprises of two hot standby management units. The hot standby management unit 1 monitors the working status of an application processor 1, and sends mode codes to the application processor to inform its working mode. In the same way, a hot standby management unit 2 controls working status of an application processor 2. The two hot standby management units adopt respective self-lock/interlock logic between each other to select a channel in normal operation to be the one in active status, so as to avoid the "dual-channel-active" or "dual-channel-standby" status which may be occurred when the two channels make determination for each other. At the same time, the hot standby status management layer outputs synchronous signals, so that the two application processors of the application layer are in working status with synchronous cycles.

The application processing layer comprises two application processors (dual-processor). At the beginning of each control cycle, both of the two processors can receive working mode codes from corresponding hot standby management units, and cam out workflow of active status or standby status according to the received working mode codes, and then report their own working statuses to the hot standby management unit upon finishing application processing workflow. The hot standby management unit determines whether the working statuses of the two processors are normal or not according to the above-mentioned information. When either of the application processors breaks, the hot standby management unit would control the two processors to implement a switching between active and standby statuses, and take a redundant strategy for the application processor in abnormal operation to stop it from working.

The data communication layer comprises two communicators which mainly carry out functions of data forwarding, that is, receiving data from outside and forwarding the data to the two application processors of the application processing layer, and meanwhile sending the calculation results from the application processor which is in active status to an external system. The two communicators operating independently of each other constitute a redundant configuration structure such that when one of them breaks down, the other can still finish data forwarding for the two processors of the application processing layer. The status of each communicator is co-monitored by the two hot standby management units of the hot standby management layer. During normal operation, the communicator can send periodically variable level signals to the hot standby management layer. Once this kind of dynamic signal is stopped or anything unusual is happening thereto, the hot standby management layer determines that such communicator is abnormal and sends such status to the two application processors of the application processing layer, for the convenience of the application processors to select a normal communicator for output.

One of the hot standby management units of the hot standby management layer and one of the application processors of the application processing layer together form a channel for the hot standby system. The two communicators of the data communication layer are redundant for each other, and shared by the two channels. The data exchange among the three layers of the structure is realized by a high-speed communication bus, which could satisfy the real-time requirements of the whole dual-channel hot standby system. The hot standby management unit, the high-speed communication bus and the communicators all adopt redundant structures, which can improve the reliability and availability of the whole system.

Figure 2:
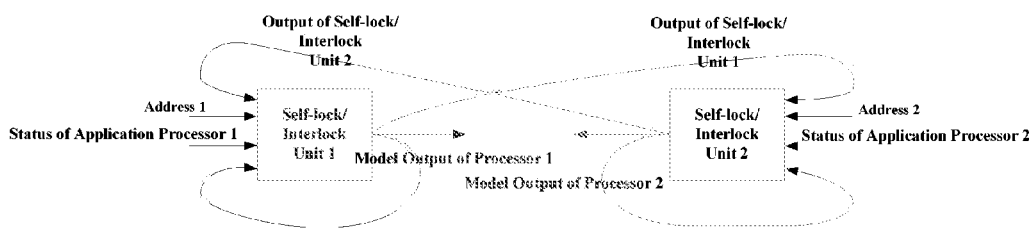
FIG. 2 is an illustrative block diagram of the interlock/self-lock logic used in the method according to an embodiment of the present invention.

In the dual-channel hot standby system, a key point for realizing the system functions is to reliably perform the status switching between active and standby channels. The management for the working modes of the two channels is carried out by a self-lock/interlock logic. An illustrative block diagram of the interlock/self-lock logic is shown in FIG. 2.

The interlock/self-lock logic between the two hot standby management units is divided into two portions entirely consistent with each other, which are respectively located in the two hot standby management units, and individually referred as self-lock/interlock unit 1 and interlock/self-lock unit 2. A self-lock/interlock link bus is used for interacting the working mode codes obtained by the two self-lock/interlock units through determination, in order to carry out the self-lock/interlock logic. Selecting a channel in normal operation as the one in active status.

The input of each interlock/self-lock unit includes:

1) status input of a local application processor;
2) output of a local self-lock/interlock unit;
3) output of the self-lock/interlock unit at the other side;
4) the address of the interlock/self-lock unit (1 or 2)

The output of each interlock/self-lock unit is the working mode codes to be sent to the application processors.

Figure 3:
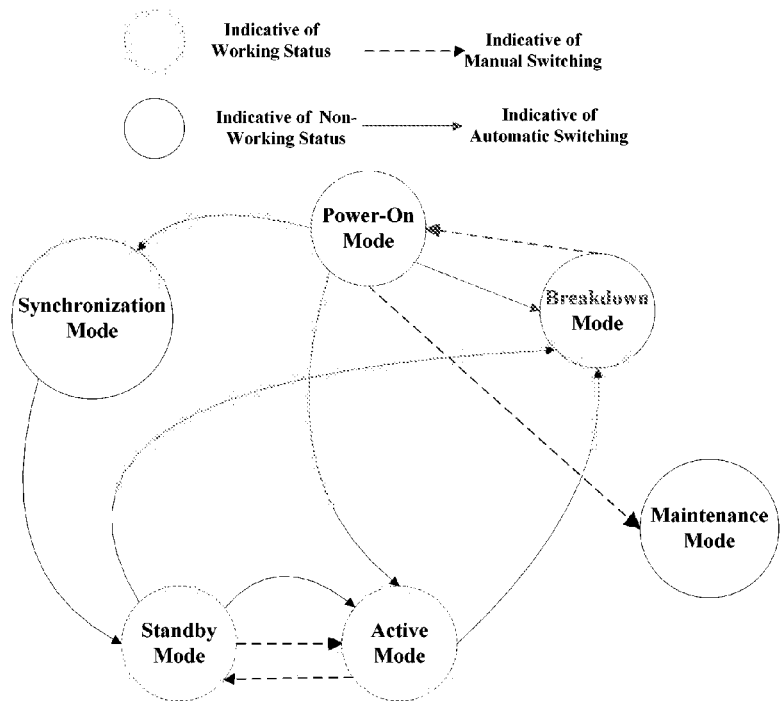
FIG. 3 is a schematic view showing a conversion between working modes of the application processor in the method according to an embodiment of the present invention.

The self-locking/interlocking unit classifies the working mode codes reported by the local application processor into a working status and a non-working status. The working status comprises a active mode and a standby mode. The non-working status comprises a power on mode, a breakdown mode, a synchronization mode and a maintenance mode. The conversion relations among the modes are shown as FIG. 3. Under various working modes, the application processors complete works as follows:

1) the power-on mode: completing power-on initialization and self-check;
2) the active mode: completing normal application processing function, and sending output data to the communicator;
3) the standby mode: completing normal application processing function without sending output data to the communicator;
4) the synchronization mode: an application processor which is in the synchronization mode requests synchronous data from another application processor which is in the active mode, and completes synchronization for its own status according to these data;
5) the breakdown mode: the application processors go wrong in operation, and stop running;
6) the maintenance mode: the system software can be upgraded and maintained under such mode;

The self-lock/interlock unit determines the modes of the two channels according to the stored information regarding the modes of the application processors in the last cycle and the conversion relations as shown in FIG. 3. The self-lock/interlock unit 1 reads a local address when a priority issue of interlocking is occurred. If the local address is read as "1", the output of the self-lock/interlock unit is representative of an active status. The self-lock/interlock unit has a redundant design, in order to ensure its availability.

Figure 4:
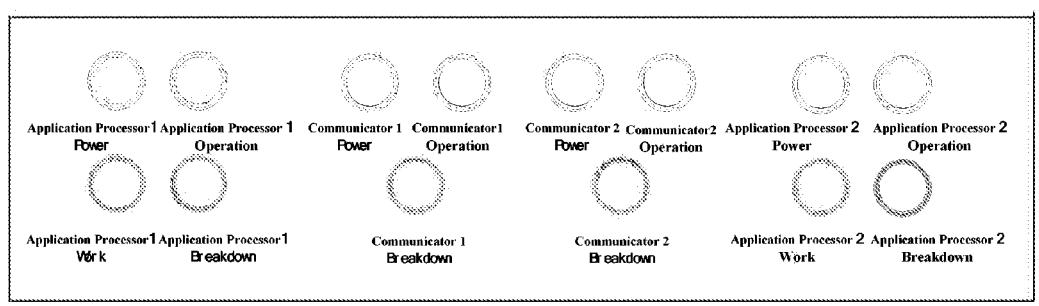
FIG. 4 is a schematic view of a control panel defined in the system according to an embodiment of the present invention.

In order to facilitate monitoring the status of the dual-channel hot standby system, the system provides a control panel as shown in FIG. 4. The control panel has several functions including displaying working statuses of the two channels and carrying out manual switching. Several status indicator lights are disposed on the upper row of the control panel, showing the information regarding whether the application processors and the communicators are power on, and whether they are in working status. Several buttons with lights are disposed on the lower row. When the working status indicator light of application processor 1 or application processor 2 is on, it is indicating that the corresponding application processor is in the active mode. When the breakdown status indicator light is on, it is indicating that the corresponding application processor or communicator breaks down, and it requires to manually press the indicator lights which is on to re-power on the corresponding devices. The control panel further provides manual switching functions. When the system is in normal operation, pressing the working button of the application processor 1 or application processor 2 would designate a corresponding application processor to enter into the active mode and the other application processor into the standby mode. When it's needed to upgrade the software or conduct manual maintenance, it is possible to simultaneously press the working buttons of the two application processors within several seconds upon the system is powered on, so that the whole system can enter into the maintenance mode for maintenance.

In order to make sure that the switching action between active and standby statuses is a seamless one, it is necessary to ensure a status synchronization between the active and standby channels. In the present solution, before entering into the standby mode, the application processor must conduct synchronization in the synchronization mode according to the data from the application processor which is in the active mode, apart from which, the status synchronization between the two processors of the application processing layer is further ensured by the two of the following ways:

1) the two processors of the application processing layer are in working status with synchronous cycles;

2) the communicators of the data communication layer ensure that the input data sent to the dual processors of the application processing layer are consistent with each other.

As the two processors of the application processing layer are under the control of the hot standby status management layer, cycle control modules are necessary for the two hot standby management units in order to ensure a seamless switching. This in turn requires the cycle control module of the hot standby management unit in the standby channel to unconditionally follow the one of the hot standby management unit in the active channel, that is, the cycle control module of the hot standby management unit in the active channel should be synchronized with the one of the hot standby management unit in the standby channel.

In this way, a synchronous link bus must be established between the cycle control modules in the two hot standby management units. However, considering that the active and standby statues of the two hot standby management units are variable, the synchronous link bus can only be used by the hot standby management unit in the present active channel as an output thereof, and the present standby channel can only receive synchronous signals from the synchronous link bus. Thus, the synchronous link bus is responsible for transmitting synchronous signals of the present active channel to the present standby channel. A schematic block diagram of the cycle control module is shown as FIG. 5.

Figure 5:
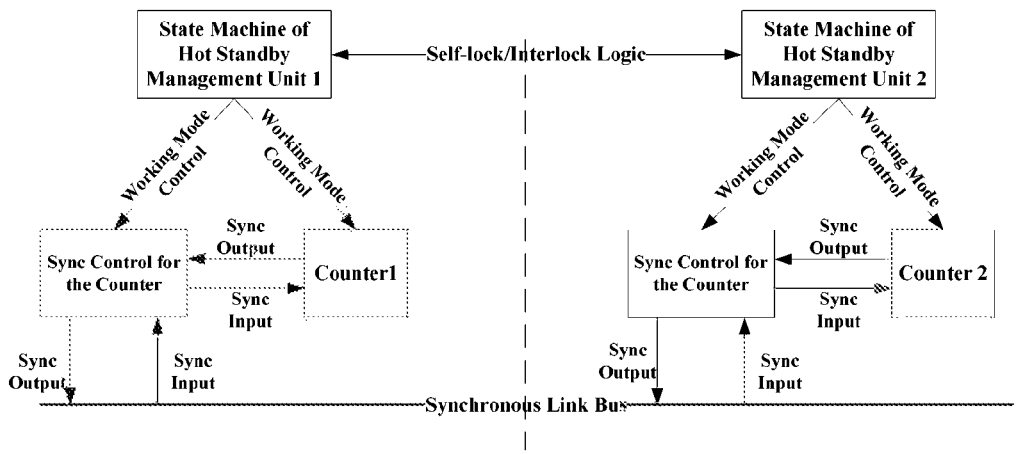
FIG. 5 is a schematic block diagram of a cycle control module in the system according to an embodiment of the present invention.

It can be seen from FIG. 5 that, a counter in the cycle control module of the hot standby management unit is controlled by the synchronous signals. Such synchronous signals are originated from either the output of the cycle control module of a local cycle control unit or the output of the cycle control module of the active hot standby management unit.

When the channel in which the hot standby management unit arranged is the active one, the synchronous signals output from the cycle control module thereof can control both of its own counter and that of the cycle control module in the standby channel via the synchronous link bus.

Therefore, a transfer switch may be arranged for the synchronous signals of the counter in the cycle control module of the hot standby management unit, and is responsible for controlling the cycle control module to either use its own synchronous signals or use the synchronous signals in the cycle control module of the active hot standby management unit, depending on the active or standby status of the hot standby management unit. At the same time, the synchronous link bus of the cycle control module of the hot standby management unit should also be provided with a transfer switch. When the hot standby management unit is the "active" one, the cycle control module thereof outputs the synchronous signals. When the hot standby management unit is the "standby" one, the cycle control module thereof inputs the synchronous signals. It's emphasized that, the cycle control module should apply a redundant design to ensure its availability.

Figure 6:
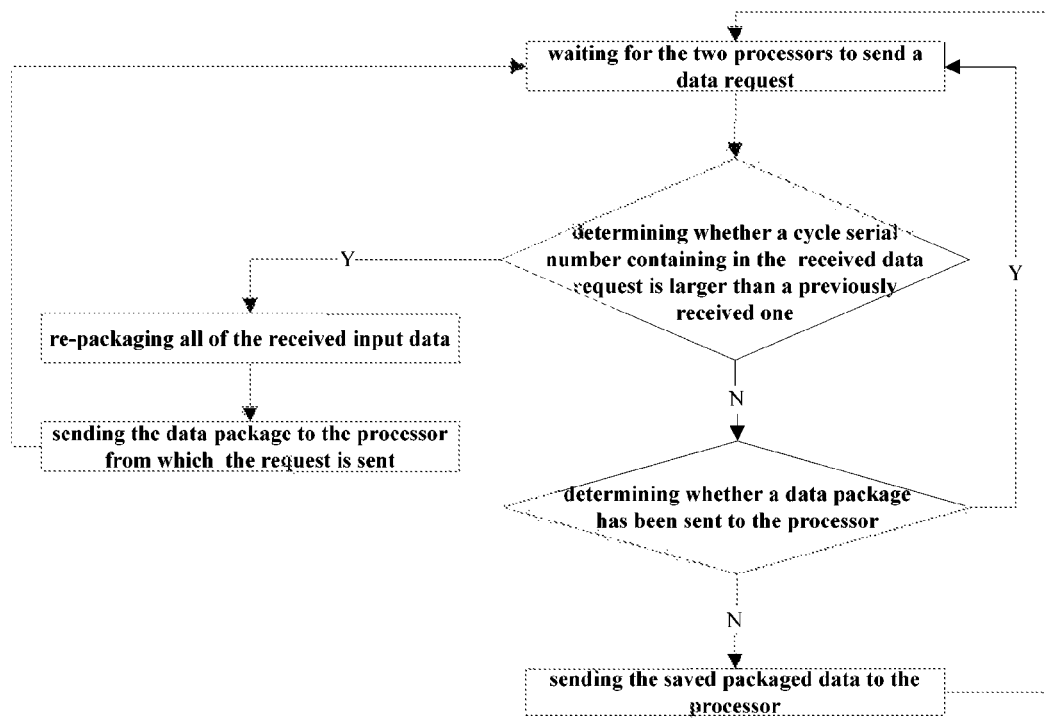
FIG. 6 is a flow chart showing a consistency control strategy for sending data adopted by the communicators in the system according to an embodiment of the present invention.

In most control systems, the arrival of input data from outside is always random. With regard to a periodically controlled system, it always starts processing the output data at a certain regular time. Since the two processors in the hot standby system that are responsible for application processing can not be in absolutely synchronous status, which may result in the inconsistency of the input data to be processed in a certain control cycle, thereby resulting in non-synchronous status of the two processors. The benefit of setting a data communication management layer is to ensure, via the communicators, the consistency of the data sent to the two processors of the application processing layer. In order to realize this function, it is necessary for the application processors to send data requests to the communicators before conducting data input processing. The data request message comprises information about the serial number of the cycle, for the communicators to make determination. The process that the communicators carry out the consistency of the transmitted data is shown as FIG. 6.

The application of above-mentioned methods can ensure that the operation statuses of the active channel and the standby channel are synchronous in cycles. As for the method of verifying the consistency between the active and standby channels, means of unconditionally supporting the output of the active channel is applied therein. When each control cycle finishes its application processing, the active channel sends its own calculation result to the standby channel, which compares the received calculation result with a local calculation result. If an inconsistency is occurred between the two results, it is determined that the standby channel goes wrong, and then converting the channel into the breakdown mode.

INDUSTRIAL APPLICABILITY

The present invention provides a dual-channel hot standby system and a method for carrying out dual-channel hot standby by using the same. This solution can avoid the occurrence of "dual-channel-active" or "dual-channel-standby" status; ensure a synchronization of the control cycles of the two channels; reduce the time of the system for responding to breakdown; meet the real-time requirements; enhance the reliability and availability of the system; and ensure a seamless switching between active status and standby status, so it possesses industrial applicability.

The invention claimed is:

1. A dual-channel hot standby system having a hierarchical structure, comprising:
a hot standby status management layer including two hot standby management units as judgment equipments of a third party, an application processing layer including two application processors, and a data communication layer including two communicators; the hot standby status management layer is used for controlling the setting and switching between a active status and a standby status of the two application processors, monitoring the working status of the data communication layer, and carrying out synchronization of the control cycles for the two channels of the system; wherein one of the hot standby management units controls one of the application processors, and together constitute a channel of the system therewith; the data communication layer is used for receiving data from outside, and forwarding the data to the application processing layer;

one of the hot standby management units monitors a working status of the application processors and sends working mode codes to one of the application processors to inform its working mode; the other hot standby management unit controls a working mode of the other application processor; the two hot standby management units adopt respective self-lock/interlock logic between each other to select a channel in normal operation to be the one in active status, so as to avoid a "dual-channel-active" or 'dual-channel-standby" status which may be occurred when the two channels make determination for each other; at the same time, the hot standby status management layer outputs synchronous signals, so that the two application processors of the application layer are in working status with synchronous cycles;

the application processing layer includes two application processors; at the beginning of every control cycle, the two application processors receive working mode codes from corresponding hot standby management units, and perform workflow for active status or standby status according to the received working mode codes; upon finishing such workflow, the two application processors report their own working statuses to the corresponding hot standby management units, which determine whether such working statuses are normal or not according to the information regarding working statuses; when either of the application processors is found to be abnormal in working, the hot standby management units control the two application processors to perform a switching of active and standby statuses and take a redundant strategy for the abnormal application processor to stop it from working;

the data communication layer includes two communicators which receive data from outside and forward the data to the two application processors of the application processing layer, and meanwhile send calculation results from the application processor which is in active status to an external system; the two communicators operating independently of each other constitute a redundant configuration structure such that when one of them breaks down, the other can still finish data forwarding for the two processors of the application processing layer; the status of each communicator is co-monitored by the two hot standby management units of the hot standby management layer; during normal operation, the communicator can send periodically variable level signals to the hot standby management layer; once this kind of dynamic signal is stopped or anything unusual is happening thereto, the hot standby management layer determines that such communicator is abnormal and sends such status to the two application processors of the application processing layer, so as to facilitate the application processors to select a normal communicator for output;

one of the hot standby management units of the hot standby management layer and one of the application processors of the application processing layer together form a channel for the hot standby system; the two communicators of the data communication layer are redundant for each other, and shared by the two channels; the data exchange among the three layers of the structure is realized by a high-speed communication bus; the hot standby management unit, the high-speed communication bus and the communicators all adopt redundant structures; and, in order to ensure a seamless switching of active and standby statuses, three of the following ways are used at the same time: 1) the application processor, before it enters into the standby mode, conducts a synchronization in the synchronous mode according to the data from the application processor which is in the active mode; 2) the hot standby status management layer outputs synchronous signals to the two application processors, which allows the two application processors to work with synchronous control cycles; 3) the data communication layer ensures an consistency of the data sent to the two application processors by identifying the information regarding a serial number of the cycle in the data request from the application processing layer.

2. The system of claim 1, wherein the two hot standby management units are connected with each other by a synchronization link bus, which is used for transmitting synchronous signals from a present active channel to a present standby channel.

3. A method for carrying out dual-channel hot standby by using the system of claim 1, wherein, the hot standby status management layer controls the setting of the active status and the standby status of the two application processors according to the following steps:

a hot standby management unit sends working mode codes to a corresponding application processor to inform its working mode, wherein, the working mode codes are representative of a working status including an active mode and a standby mode, or representative of a non-working status including a power on mode, a breakdown mode, a synchronization mode and a maintenance mode.

4. The method of claim 3, wherein the synchronization of control cycles for the two channels is specifically carried out by the hot standby status management layer as follows:

the hot standby management unit in the present active channel sends synchronous signals through a synchronous link bus between the two hot standby management units, from which the hot standby management unit in the present standby channel receives such synchronous signals, in order to ensure that the two hot standby management units are in working status with synchronous control cycles.

5. The method of claim 3, wherein the data communication layer forwards data from outside to the application processing layer upon receiving a data request from the application processing layer, and the data communication layer ensures a synchronization of the data sent to the two application processors by identifying the information regarding a serial number of the cycle in the data request from the application processing layer.

* * * * *